United States Patent [19]
Kriessmann et al.

[11] Patent Number: 5,939,482
[45] Date of Patent: Aug. 17, 1999

[54] METHOD FOR THE TWO-STAGE PREPARATION OF AQUEOUS AUTOCROSSLINKING COPOLYMER DISPERSIONS AND THEIR USE FOR COATING MATERIALS

[75] Inventors: Ingo Kriessmann; Rami-Raimund Awad; Hannelore Gsoell; Kurt Gossak, all of Graz; Bernhard Hirschmann, Gleisdorf, all of Austria

[73] Assignee: Vianova Resins Aktiengesellschaft, Wendorf, Austria

[21] Appl. No.: 08/836,304

[22] PCT Filed: Nov. 23, 1995

[86] PCT No.: PCT/AT95/00227

§ 371 Date: May 9, 1997

§ 102(e) Date: May 9, 1997

[87] PCT Pub. No.: WO96/16998

PCT Pub. Date: Jun. 6, 1996

[30] Foreign Application Priority Data

Nov. 29, 1994 [AT] Austria .................................... 2210/94
Nov. 8, 1995 [AT] Austria .................................... 1833/95

[51] Int. Cl.$^6$ ........................................................ C08F 2/16
[52] U.S. Cl. ........................... 524/460; 523/201; 524/521; 524/522; 526/201; 526/203
[58] Field of Search ............................. 523/201; 524/460, 524/521, 522; 526/201, 203

[56] References Cited

U.S. PATENT DOCUMENTS

| | | | |
|---|---|---|---|
| 4,997,772 | 3/1991 | Sutton et al. | 525/902 |
| 5,021,469 | 6/1991 | Langerbeins et al. | 525/902 |
| 5,055,506 | 10/1991 | Knutson | 524/100 |
| 5,116,895 | 5/1992 | Knutson | 524/252 |
| 5,308,890 | 5/1994 | Snyder | 525/902 |
| 5,369,163 | 11/1994 | Chiou et al. | 526/201 |
| 5,409,971 | 4/1995 | Wolfersberger et al. | 525/902 |
| 5,498,659 | 3/1996 | Esser | 524/549 |

FOREIGN PATENT DOCUMENTS

555774 A1  8/1993  European Pat. Off. .

*Primary Examiner*—Judy M. Reddick
*Attorney, Agent, or Firm*—Foley & Lardner

[57] ABSTRACT

The invention concerns a two-stage method for the preparation of aqueous, self-crosslinking copolymer dispersions made from acrylate copolymers having acetoacetyl and carboxylic groups. The copolymers are neutralized with polyamines which act as crosslinking agents. These copolymers are useful in paints as binders that crosslink at room temperature or at elevated temperatures.

13 Claims, No Drawings

METHOD FOR THE TWO-STAGE PREPARATION OF AQUEOUS AUTOCROSSLINKING COPOLYMER DISPERSIONS AND THEIR USE FOR COATING MATERIALS

BACKGROUND OF THE INVENTION

1. Field of the Invention

The invention relates to a two-stage method of preparing aqueous, autocrosslinking copolymer dispersions based on acrylate copolymers which have acetoacetyl groups and carboxyl groups and which are neutralized with polyamines which act as a crosslinking component, and to their use as binders for storage-stable one-component coating materials and, in combination with low molecular mass polyisocyanates, as binders for two-component coating materials which crosslink at room temperature or at elevated temperature.

2. Description of Related Art

EP 0555774 A1 discloses a one-stage method of preparing such copolymer dispersions. The products, however, have a disadvantage. Firstly, a high proportion of acetoacetyl groups is required in order to achieve a sufficient crosslinking density of the coating films; secondly, this high proportion of appropriate monomers brings about the formation, during the copolymerization, of bits and coagulum which can be removed again only at great length and using complex apparatus.

SUMMARY OF THE INVENTION

It has surprisingly now been found that films of aqueous copolymer dispersions with small proportions of acetoacetyl groups also have a high crosslinking density if the emulsion copolymerization takes place by a two-stage method in which monomers having in each case acetoacetyl or carboxyl groups are employed only in the first stage.

The invention relates accordingly to a method of preparing aqueous, autocrosslinking copolymer dispersions whose monomer composition is (Aa) from 3 to 35% by weight, preferably from 8 to 15% by weight, of (meth)acrylate monomers containing acetoacetyl groups, A(b) from 1 to 20% by weight, preferably from 3 to 16% by weight, of α,β-ethylenically unsaturated carboxylic acids, preferably (meth)acrylic acid, A(c) from 11 to 96% by weight, preferably from 30 to 70% by weight, of (meth)acrylic alkyl esters and, if desired, diesters of maleic or fumaric acid, and A(d) from 0 to 40% by weight, preferably from 0 to 25% by weight, of other free-radically polymerizable monomers, such as vinyl aromatic compounds, vinyl esters, hydroxyalkyl (meth)acrylates and (meth)acrylamide, the sum of the percentages of components (Aa) to (Ad) necessarily being 100, and the dispersions being neutralized with polyamines which act as a crosslinking component, which method is characterized in that A) a two-stage free-radical emulsion polymerization is carried out, with the proviso that in the first stage from 60 to 90% by weight of a mixture of the monomers (Aa) to (Ad) and in the second stage from 10 to 40% by weight of a mixture of the monomers (Ac) and (Ad) are copolymerized, the sum of the percentages again necessarily being 100 and the condition holding that the acrylate copolymers (A) contain acetoacetyl groups in an amount of from 0.2 to 1.7 mol/kg, preferably from 0.4 to 0.8 mol/kg, and carboxyl groups in an amount of from 0.15 to 1.6 mol/kg, preferably from 0.4 to 0.75 mol/kg, and that the carboxyl groups are present in an amount of from 50 to 95 mol-%, preferably from 80 to 90 mol-%, relative to the acetoacetyl groups, and subsequently B) the carboxyl groups of the copolymer dispersions (A) are reacted with polyamines which contain at least two primary amino groups in the molecule, in a proportion of from 50 to 100 mol-%, preferably from 90 to 100 mol-%, relative to the total primary amino groups, with salts being formed.

DETAILED DESCRIPTION OF PREFERRED EMBODIMENTS

The invention additionally relates to the copolymer dispersions prepared in accordance with the invention and to their use as binders for storage-stable one-component coating materials and, in combination with low molecular mass polyisocyanates, as binders for two-component coating materials which crosslink at room temperature or at elevated temperature.

The primary polyamines serve as neutralizing agents for stabilizing the aqueous copolymer dispersions and, finally, as a crosslinking component during film formation.

In accordance with the invention the copolymer dispersions are prepared by the method of a two-stage free-radical emulsion copolymerization in a known manner. In this method the monomer components Aa) to Ad) defined in the main claim are employed in the stated proportions.

As monomer component (Aa) use is made of "N-diacetone(meth)acrylamide" (meth)acrylate monomers containing acetoacetyl groups, such as (meth)acrylic acetoacetoxyalkyl esters, preferably the ethyl ester.

As monomer component (Ad) examples of vinylaromatic compounds are styrene and p-methylstyrene and an example of vinyl esters is vinyl acetate.

The condition holds that the acrylate copolymers (A) contain acetoacetyl groups in an amount of from 0.2 to 1.7 mol/kg, preferably from 0.4 to 0.8 mol/kg, and carboxyl groups in an amount of from 0.15 to 1.6 mol/kg, preferably from 0.4 to 0.75 mol/kg, and that the carboxyl groups are present in an amount of from 50 to 95 mol-%, preferably from 80 to 90 mol-%, relative to the acetoacetyl groups.

Subsequently, the carboxyl groups of the copolymer dispersions (A) even reacted with polyamines which have at least two primary amino groups in the molecule, in a proportion of from 50 to 100 mol-%, preferably from 90 to 100 mol-%, relative to the total primary amino groups, with salts being formed.

Examples of polyamines are alkylenediamines, such as ethylenediamine and its homologs and isomers, and also diprimary polyalkylenepolyamines, such as diethylenetriamine, and other polyamines, such as trimethylolpropanehexaethoxytriamine or diprimary polyethoxydiamines.

The copolymer dispersions prepared in accordance with the invention have an excellent storage stability and give films having good resistance properties. They can be employed as binders for industrial coatings and primers. In addition, they can be used to formulate clearcoats which are used for coating wood, plastic, leather or paper.

The copolymer dispersions are crosslinked by reacting the primary amino groups of the polyamines with the keto groups of the acetoacetyl groups of the copolymer dispersions (A) even at room temperature following the evaporation of a substantial proportion of the water.

With the proviso that hydroxyalkyl (meth)acrylates are among those monomers used as component (Ad), the copolymer dispersions can also be combined advantageously with low molecular mass polyisocyanates.

Polyisocyanates employed are customary commercial oligomers, for example isocyanurates, biuret types or allophanate types of aliphatic diisocyanates, such as hexamethylene diisocyanate, isophorone diisocyanate or dicyclohexylmethane diisocyanate, in a binder/polyisocyanate ratio of from 90:10 to 60:40 (based on solids).

Two-component coating materials of this kind have relatively long pot lives and, in comparison with one-component coating materials, in the form of coating films after a drying period of 4 weeks they possess not only the expected higher crosslinking density but also a markedly reduced tendency to bring about yellow discoloration of light-colored woods.

The formulation of water-thinnable coating materials using the binders prepared in accordance with the invention, and the application of such coating materials, are known to the skilled worker.

The examples which follow illustrate the invention without restricting it in its scope. All data in parts or percentages relate, unless specified otherwise, to units of weight.

1. EXAMPLES 1 TO 7 AND COMPARISON EXAMPLE V1

Example 1

In a reactor suitable for emulsion copolymerization, with reflux condenser, thermometer and two feed vessels, a mixture of 360 parts of demineralized water, 24 parts of Triton X 200 (sodium alkylaryl polyethersulfonate, manufacturer: Rohm & Haas, USA) and 5.4 parts of Triton X 165 (octylphenol ethoxylate, manufacturer: Rohm & Haas, USA) is homogenized with stirring.

The feed vessel I is charged with a homogeneous emulsion consisting of 1150 parts of demineralized water, 24 parts of Triton X 200, 10 parts of Triton X 165, 3.2 parts of ammonium peroxodisulfate, 165 parts of butyl methacrylate, 280 parts of butyl acrylate, 275 parts of styrene, 140 parts of acetoacetoxyethyl methacrylate and 40 parts of methacrylic acid. 5% of this preemulsion is run into the reactor. The contents of the reactor are heated to 85° C. with stirring and held at this temperature for 10 minutes. The remaining contents of feed vessel I are then metered into the reactor at a uniform rate over the course of 120 minutes at 85° C.

Subsequently, a homogeneous emulsion of 100 parts of demineralized water, 3.1 parts of Triton X 200, 2.4 parts of Triton X 165, 30 parts of butyl acrylate, 70 parts of styrene and 0.8 parts of ammonium peroxodisulfate is metered in from feed vessel II over the course of 30 minutes at 85° C. After the end of the feed, the contents of the reactor are heated to 88° C. and held at this temperature for 120 minutes. Finally, they are cooled to 25° C., and 115 parts of a 20% strength aqueous diethylenetriamine solution are added with stirring over the course of one hour. A 38.8% opalescent dispersion is obtained having a mean particle size of 90 nanometres. The pH is 7.9.

Example 2 to 7 are prepared in analogy to Example 1. The compositions of the initial reactor charges and of the feeds, and altered polymerization parameters, are given in Table 1, in which the following abbreviations are used:

AAEMA acetoacetoxyethyl methacrylate
APS ammonium peroxodisulfate
AA acrylic acid
BA butyl acrylate
BMA butyl methacrylate
BV Hostapal BV conc. (Hoechst AG, DE)
DAMA diacetonemethacrylamide
DBF dibutyl fumarate
DETA diethylenetriamine
DW demineralized water
EHA 2-ethylhexyl acrylate
HBA 4-hydroxybutyl acrylate
HDA 1,6-hexamethylenediamine
HEMA 2-hydroxyethyl methacrylate
MA methacrylic acid
PMST p-methylstyrene
ST styrene
X 165 (Triton X 165) Rohm & Haas, USA)
X 200 (Triton X 200) Rohm & Haas, USA)
X 305 (Triton X 305) Rohm & Haas, USA)
(alkylaryl polyether alcohol)

Comparison Example V1

One-stage copolymer dispersion with high acetoacetoxy functionality (corresponding to Example 7 of EP 0555774 A1) In a reactor suitable for emulsion polymerization, 40 parts of DW and 27 parts of a liquor containing 80 parts of DW, 100 parts of a mixture of 45 parts of AAEMA, 10.9 parts of AA, 28.1 parts of BA and 16 parts of BMA, 0.5 part of Triton X 305, 1 part of dodecylsulfonate, 0.2 part of tert-dodecyl mercaptan and 1 part of APS are heated to 85° C. The remaining 155.7 parts of the liquor are added uniformly over the course of 2 hours from a feed vessel which is provided with a stirrer. The theoretical solids content of 45% is reached after a subsequent reaction time of 2 hours. The batch is cooled to 25° C. and neutralized with 31.2 parts of a 20% strength aqueous solution of DETA. The copolymer dispersion prepared in one stage contains fractions of bits and coagulum which require removal by filtration.

The characteristic data for the copolymer dispersions prepared in accordance with Examples 1 to 7 and Comparison Example V1 are summarized in Table 2.

TABLE 1

| | Example | | | | | | | |
|---|---|---|---|---|---|---|---|---|
| | 1 | | 2 | | 3 | | 4 | |
| Initial reactor charge | 360 | DW | 420 | DW | 325 | DW | 325 | DW |
| | 24 | | X 200 | 25 | X 200 | 25 | X 200 | 10 | BV |
| | 5.4 | | X 165 | 7 | X 165 | 7 | X 165 | 7 | X 165 |
| Feed stream I | 1150 | DW | 1210 | DW | 1100 | DW | 1000 | DW |
| | 24 | | X 200 | 25 | X 200 | 25 | X 200 | 10 | BV |
| | 10 | | X 165 | 5.6 | X 165 | 5.6 | X 165 | 5.6 | X 165 |
| | 3.2 | | APS | 5 | APS | 5 | APS | 5 | APS |
| | 165 | | BMA | 195 | MMA | 185 | EHA | 250 | ST |
| | 280 | | BA | 200 | BA | 420 | BMA | 285 | BA |

TABLE 1-continued

|  |  |  |  |  |  |  |  |  |
|---|---|---|---|---|---|---|---|---|
|  |  | 275 | ST | 320 | AAEMA | 100 | BA | 120 | AAEMA |
|  |  | 140 | AAEMA | 85 | AA | 70 | DAMA | 45 | MA |
|  |  | 40 | MA |  |  | 25 | AA |  |  |
| % Feed stream I in initial reactor charge |  | 5 |  | 7.5 |  | 7.5 |  | 10 |  |
| Feed time I (min) |  | 120 |  | 100 |  | 100 |  | 90 |  |
| Feed stream II |  | 100 | DW | 200 | DW | 200 | DW | 250 | DW |
|  |  | 3.1 | X 200 | 6 | X 200 | 6 | X 200 | 5 | BV |
|  |  | 2.4 | X 165 | 1.4 | X 165 | 1.4 | X 165 | 2 | X 165 |
|  |  | 0.8 | APS | 0.8 | APS | 0.8 | APS | 1 | APS |
|  |  | 30 | BA | 150 | BMA | 150 | ST | 100 | pMST |
|  |  | 70 | ST | 50 | BA | 50 | EHA | 150 | BA |
|  |  |  |  |  |  |  |  | 50 | BMA |
| Feed time II (min) |  | 30 |  | 45 |  | 45 |  | 60 |  |
| Neutralizing agent* |  | 23 | DETA | 43 | HDA | 17.5 | DETA | 29 | HDA |

|  |  | Example |  |  |  |  |  |
|---|---|---|---|---|---|---|---|
|  |  | 5 |  | 6 |  | 7 |  |
| Initial reactor charge |  | 280 | DW | 325 | DW | 325 | DW |
|  |  | 10 | BV | 25 | X 200 | 10 | BV |
|  |  | 7 | X 305 | 7 | X 165 | 7 | X 165 |
| Feed stream I |  | 1100 | DW | 1100 | DW | 1000 | DW |
|  |  | 8 | BV | 25 | X 200 | 10 | BV |
|  |  | 5 | X 305 | 5.6 | X 165 | 5.6 | X 165 |
|  |  | 5 | APS | 5 | APS | 5 | APS |
|  |  | 150 | MMA | 135 | EHA | 200 | ST |
|  |  | 205 | DBF | 380 | BMA | 335 | BA |
|  |  | 180 | AAEMA | 50 | BA | 120 | AAEMA |
|  |  | 65 | MA | 100 | DAMA | 50 | HEMA |
|  |  |  |  | 100 | HBA | 45 | MA |
|  |  |  |  | 35 | AA |  |  |
| % Feed stream I in initial reactor charge |  | 10 |  | 7.5 |  | 10 |  |
| Feed time I (min) |  | 90 |  | 100 |  | 90 |  |
| Feed stream II |  | 300 | DW | 200 | DW | 250 | DW |
|  |  | 7 | BV | 6 | X 200 | 5 | BV |
|  |  | 3 | X 305 | 1.4 | X 165 | 2 | X 165 |
|  |  | 1.2 | APS | 0.8 | APS | 1 | APS |
|  |  | 200 | ST | 150 | ST | 100 | pMST |
|  |  | 100 | BA | 50 | EHA | 100 | BA |
|  |  | 100 | BMA |  |  | 50 | BMA |
| Feed time II (min) |  | 60 |  | 45 |  | 60 |  |
| Neutralizing Agent* |  | 34 | DETA | 25 | DETA | 29 | HDA |

*as a 20% strength aqueous solution

TABLE 2

| Example | 1 | 2 | 3 | 4 |
|---|---|---|---|---|
| Characteristic data |  |  |  |  |
| Solids content [%] | 38.8 | 35.8 | 39 | 38.6 |
| pH | 7.9 | 7.8 | 8 | 7.9 |
| Mean particle size [nm] | 90 | 95 | 95 | 105 |
| mol/kg AAc[1] | 0.65 | 1.5 | 0.38 | 0.56 |
| mol/kg C[2] | 0.47 | 1.18 | 0.35 | 0.52 |
| mol % C[3] | 72 | 79 | 92 | 93 |
| mol % A[4] | 95 | 94 | 97 | 96 |
| Example | 5 | 6 | 7 | V1 |
| Characteristic data |  |  |  |  |
| Solids content [%] | 37.1 | 38.6 | 38.6 | 41.2 |
| pH | 7.6 | 8 | 7.9 | 8.2 |
| Mean particle size [nm] | 100 | 90 | 105 | 180 |
| mol/kg AAc[1] | 0.84 | 0.54 | 0.56 | 2.1 |
| mol/kg C[2] | 0.76 | 0.49 | 0.52 | 1.51 |
| mol % C[3] | 90 | 91 | 93 | 87 |
| mol % A[4] | 87 | 90 | 96 | 80 |

[1] Acetoacetyl groups
[2] Carboxyl groups
[3] mol % of carboxyl groups relative to AAc
[4] mol % of prim. amino groups relative to C

2. COATINGS PERFORMANCE TESTING OF THE COPOLYMER DISPERSIONS PREPARED IN ACCORDANCE WITH EXAMPLES 1 TO 5 AND PREPARED IN ACCORDANCE WITH COMPARISON EXAMPLE V1 IN CLEARCOATS

The clearcloats 1 to 5 and V1 were prepared from 100 parts of binder (as solids), 0.8 part of a customary commercial antifoam, 0.2 part of a customary commercial leveling agent, an optional rheology additive (e.g. PU thickener) and deionized water, and these clearcoats were subjected to the following coatings performance tests whose results are summarized in Table 3:

Freedom from tack: drying recorder, glass strips, 150 μm wet film thickness, at 20° C. (stated in minutes)

Sandability: veneered wood, 150 μm wet film thickness; the parameter tested is the clogging of sandpaper (grade 320) after 10 strokes following a drying time of 60 minutes at room temperature (0=no clogging, MIN=minimal clogging.

KÖNIG pendulum hardness (DIN 53157): glass plates, 120 μm wet film thickness, drying time of 24 hours at 20° C.

Resistance to acetone, ethanol and water: glass plates, 120 μm wet film thickness, drying time of 24 hours at 20° C. A cotton wool pad impregnated with the solvent is placed on the film and covered with a glass beaker. The time is measured until the film softens.

TABLE 3

| Clearcoat | 1 | 2 | 3 | 4 | 5 | V1 |
|---|---|---|---|---|---|---|
| Freedom from tack in minutes | 20 | 15 | 20 | 15 | 20 | 15 |
| Sandability | 0 | 0 | MIN | 0 | 0 | MIN |
| Pendulum hardness in seconds | 65 | 80 | 90 | 65 | 60 | 45 |
| Acetone resistance in seconds | >60 | >60 | >60 | >60 | >60 | >60 |
| Ethanol resistance in seconds | >2 | >2 | >2 | >2 | >2 | <0.25 |
| Water resistance in seconds | >24 | >24 | >24 | >24 | >24 | <1 |

3. COATINGS PERFORMANCE TESTING OF THE COPOLYMER DISPERSIONS PREPARED IN ACCORDANCE WITH EXAMPLES 6 AND 7 IN CLEARCOATS AND IN TWO-COMPONENT COATING MATERIALS

Clearcoats 6 and 7 were prepared in analogy to clearcoats 1 to 5, but additionally received per 100 parts in each case 10 or 20 parts of Bayhydur® LS 2032 (polyisocyanate based on hexamethylene diisocyanate with a free isocyanate group content of about 17% and a solids content of 100%, manufacturer: BAYER AG).

Two-component coating materials (6a and 7a) Binder: polyisocyanate=79.5:20.5 (based on solids) Solids content of the coating materials: 44.5%

Two-component coating materials (6b and 7b) Binder: polyisocyanate=66:34 (based on solids) Solids content of the coating materials: 49.2%

The clearcoats and two-component coating materials were subjected to the coatings tests already mentioned and those indicated below, the results of which are summarized in Table 4:

Pot life: The two-component coating material is stirred once an hour. This operation is repeated until gelling begins.

Yellow discoloration: 200 μm wet film thickness on maple (veneered). Assessment is made after storage for 4 weeks at room temperature (1=no measurable discoloration, 5=very severe discoloration)

TABLE 4

| Clearcoat | 6 | | | 7 | | |
|---|---|---|---|---|---|---|
| Two-component coating material | | 6a | 6b | | 7a | 7b |
| Freedom from tack in minutes | 20 | 25 | 50 | 20 | 25 | 40 |
| Sandability | 0 | 0 | MIN | 0 | 0 | MIN |
| Pendulum hardness in seconds | 75 | 70 | 50 | 70 | 65 | 45 |
| Acetone resistance in seconds | >60 | 80 | 80 | >60 | 70 | 90 |
| Ethanol resistance in seconds | >2 | >5 | >8 | >2 | >6 | >10 |
| Water resistance in seconds | >24 | >36 | >48 | >24 | >36 | >48 |
| Potlife in hours | — | >48 | 20 | — | >48 | 25 |
| Yellow discoloration | 4 | 2 | 1–2 | 4 | 2 | 1–2 |

In addition to Table 4, the coating films of the two-component coating materials 6a, 6b and 7a, 7b exhibit, in comparison with the clearcoats 6 and 7, after a drying time of 4 weeks at room temperature, as expected, markedly better results in their resistance to acetone, ethanol and water.

What is claimed is:

1. A method for preparing an aqueous, autocrosslinking copolymer dispersion comprising:
   (A) polymerizing monomers in a two-stage free-radical emulsion polymerization to prepare a copolymer dispersion (A) with the proviso that, in the first stage, from 60 to 90% by weight of the dispersion including a mixture of monomers (Aa) to (Ad) are copolymerized, and in the second stage, from 10 to 40% by weight of the dispersion including a mixture of the monomers (Ac) and (Ad) are copolymerized, where the sum of the percentages is 100 when the first and second stage are added, and where the acrylate copolymers so produced contain acetoacetyl groups in an amount of from 0.2 to 1.7 mol/kg, carboxyl groups in an amount of from 0.15 to 1.6 mol/kg, the carboxyl groups being present in an amount of from 50 to 95 mol % relative to the acetoacetyl groups, the monomers (Aa), (Ab), (Ac) and (Ad) being defined as follows with the percentages being the amount in the dispersion (A);
   (Aa) from 3 to 35% by weight of one or more (meth) acrylate monomers containing acetoacetyl groups "or N-diacetone(meth)acrylamide"
   (Ab) from 1 to 20% by weight of α, β-ethylenically unsaturated carboxylic acids;
   (Ac) from 11 to 96% by weight of one or more (meth) acrylic alkyl esters or diesters of maleic or fumaric acid; and
   (Ad) from 0 to 40% by weight of other free-radically polymerizable monomers selected from the group consisting of vinylaromatic compounds, vinyl esters, hydroxyalkyl (meth)acrylates and (meth)acrylamide,
   where the sum of the percentages of components (Aa) to (Ad) is 100; and
   (B) reacting carboxyl groups of the copolymer dispersion (A) with at least one polyamine that contains at least two primary amino groups in the molecule, in a proportion of from 50 to 100 mol %, relative to the total primary amino groups.

2. The method as claimed in claim 1, wherein component (Ac) contains a diester of maleic or fumaric acid.

3. The method as claimed in claim 1, wherein component (Aa) is selected from the group consisting of N-diacetone (meth)acrylamide and (meth)acrylic acetodacetoxyalkyl esters.

4. The method as claimed in claim 3, wherein component (Aa) is (meth)acrylic acetoacetoxyethyl ester.

5. The method as claimed in claim 1, wherein the vinyl aromatic compounds of component (Ad) are used and are selected from the group consisting of styrene and p-methylstyrene.

6. The method as claimed in claim 1, wherein the vinyl ester of component (Ad) is used and is vinyl acetate.

7. The method as claimed in claim 1, wherein the polyamine of step (B) is selected from the group consisting of ethylenediamine, diethylenetriamine, trimethylolpropane hexaethoxytriamine, and diprimary polyethoxydiamines.

8. An aqueous, auto-cross-linking copolymer dispersion prepared in accordance with the method of claim 1.

9. The dispersion as claimed in claim 8, wherein component (Ac) contains a diester of maleic or fumaric acid.

10. The dispersion as claimed in claim 8, wherein component (Aa) is selected from the group consisting of N-diacetone(meth)acrylamide and (meth)acrylic acetoacetoxyalkyl esters.

11. The dispersion as claimed in claim 10, wherein the component (Aa) is (meth)actylic acetoacetoxyethyl ester.

12. The dispersion as claimed in claim 8, wherein the vinyl aromatic compounds of component (Ad) are used and are selected from the group consisting of styrene and p-methylstyrene.

13. The dispersion as claimed in claim 8, wherein the vinyl ester of component (Ad) is used and is vinyl acetate.

* * * * *